United States Patent
Onuma

(10) Patent No.: US 10,659,822 B2
(45) Date of Patent: May 19, 2020

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Kazufumi Onuma, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/117,504

(22) Filed: Aug. 30, 2018

(65) Prior Publication Data
US 2019/0075332 A1    Mar. 7, 2019

(30) Foreign Application Priority Data

Sep. 6, 2017    (JP) .................................. 2017-171378

(51) Int. Cl.
| | |
|---|---|
| *H04N 21/218* | (2011.01) |
| *H04N 19/597* | (2014.01) |
| *H04N 13/117* | (2018.01) |
| *H04N 13/282* | (2018.01) |
| *H04N 21/2343* | (2011.01) |
| *H04N 21/262* | (2011.01) |
| *H04N 13/111* | (2018.01) |
| *H04N 13/243* | (2018.01) |

(52) U.S. Cl.
CPC ..... *H04N 21/21805* (2013.01); *H04N 13/117* (2018.05); *H04N 13/282* (2018.05); *H04N 19/597* (2014.11); *H04N 21/234363* (2013.01); *H04N 21/26241* (2013.01); *H04N 13/111* (2018.05); *H04N 13/243* (2018.05)

(58) Field of Classification Search
CPC ..... H04N 21/21805; H04N 21/234363; H04N 21/26241; H04N 13/117; H04N 13/282; H04N 13/111; H04N 13/243; H04N 19/597
USPC .......................................................... 348/159
See application file for complete search history.

(56) References Cited

U.S. PATENT DOCUMENTS

| | | | |
|---|---|---|---|
| 5,714,997 A | 2/1998 | Anderson | |
| 2013/0083173 A1* | 4/2013 | Geisner | G06F 3/013 348/51 |
| 2013/0321396 A1 | 12/2013 | Kirk et al. | |

(Continued)

FOREIGN PATENT DOCUMENTS

| | | |
|---|---|---|
| CN | 102402778 A | 4/2012 |
| JP | 2004280250 A | 10/2004 |

(Continued)

OTHER PUBLICATIONS

"Virtual View Generation for 3D Digital Video", IEEE Multimedia, vol. 4, No. 1, pp. 18-26, 1997.

(Continued)

*Primary Examiner* — Allen C Wong
(74) *Attorney, Agent, or Firm* — Carter, DeLuca & Farrell LLP

(57) ABSTRACT

An information processing apparatus specifies that material data for generating a virtual-viewpoint content at what time is stored in a storage device that stores a plurality of material data for generating a virtual-viewpoint content; and outputs, based on a result of the specification, information for causing an image to be displayed, the image indicating a time at which a virtual-viewpoint content can be generated.

24 Claims, 7 Drawing Sheets

(56) References Cited

U.S. PATENT DOCUMENTS

2017/0142341 A1* 5/2017 Ikeda .................. G11B 27/031
2018/0352272 A1* 12/2018 Breitenfeld ............ G06F 3/011

FOREIGN PATENT DOCUMENTS

| JP | 2006053694 A | 2/2006 |
| JP | 2015204512 A | 11/2015 |
| JP | 2016-126425 A | 7/2016 |

OTHER PUBLICATIONS

Notice of Reasons for Refusal issued by the Japanese Patent Office dated Jun. 15, 2018 in corresponding Japanese Patent Application No. 2017-171378, with English translation.
Decision to Grant a Patent issued by the Japanese Patent Office dated Aug. 24, 2018 in corresponding Japanese Patent Application No. 2017-171378, with English translation.
European Search Report issued by the European Patent Office dated Feb. 1, 2019 in corresponding European Patent Application No. 18188309.1.
Notification of Reason for Refusal issued by the Korean Intellectual Property Office dated Nov. 5, 2019 in corresponding Korean Patent Application No. 10-2018-0103169 with English translation.
Notification of the First Office Action issued by the State Intellectual Property Office of the People's Republic of China dated Nov. 5, 2019 in corresponding CN Patent Application No. 201811023797.1, with English translation.

* cited by examiner

FIG. 4

| MATERIAL DATA TYPE | | LIVE STREAMING | HIGH-IMAGE-QUALITY REPLAY | LOW-IMAGE-QUALITY REPLAY | PORTABLE TERMINAL | PLAYER POSITION ANALYSIS |
|---|---|---|---|---|---|---|
| OBJECT 3D MODEL | HIGH RESOLUTION | | ○ | | | |
| | LOW RESOLUTION | ○ | | ○ | | |
| | POLYGON | | | | ○ | |
| OBJECT TEXTURE | HIGH RESOLUTION | ○ | ○ | | | |
| | LOW RESOLUTION | | | ○ | ○ | |
| | POLYGON | | | | | |
| OBJECT POSITION INFORMATION | | | | | ○ | ○ |
| BACKGROUND 3D MODEL | HIGH RESOLUTION | ○ | ○ | ○ | ○ | ○ |
| BACKGROUND TEXTURE | | ○ | ○ | ○ | ○ | | ved to explain the principles of the invention.
INFORMATION PROCESSING APPARATUS, INFORMATION PROCESSING METHOD, AND MEDIUM

BACKGROUND OF THE INVENTION

Field of the Invention

The present invention relates to a content generating system.

Description of the Related Art

A technique which synchronously images an object at multiple viewpoints by using a plurality of cameras installed in different positions and generates a free-viewpoint content (virtual-viewpoint content) by using multi-viewpoint images obtained by the imaging is attracting attention. Japanese Patent Laid-Open No. 2015-204512 describes a technique which obtains an arbitrary free-viewpoint content by a video receiving apparatus by reading out video data based on generated viewpoint information in a system which generates a free-viewpoint content based on multi-viewpoint images and stores the content.

A virtual-viewpoint content can be generated by combining three-dimensional models of one or more objects. A method of generating three-dimensional models of an object imaged by a plurality of cameras can be the volume intersection method described in "Virtual View Generation for 3D Digital Video", IEEE MULTIMEDIA, Vol. 4, No. 1, pp. 18-26, 1997. In this volume intersection method, a measurement target space to be imaged by a plurality of cameras is divided by small cubes or cuboids (to be referred to as "voxels" hereinafter). Each voxel is geometrically converted and projected on a camera image, and it is determined whether the voxel is projected into the silhouette of a modeling target object in the camera image. Voxels found to be projected into the silhouette in all camera images are registered as voxels forming the target object, and an aggregate of the voxels is output as a three-dimensional model.

A virtual-viewpoint content is generated by using three-dimensional models based on the assumption that the three-dimensional models can be generated. However, when generating a virtual-viewpoint content at a given point of time, it is sometimes impossible to generate some three-dimensional models and generate the virtual-viewpoint content. In this case, it takes a long time to determine that the three-dimensional models cannot be generated, so the user takes a long time to recognize that the virtual-viewpoint content cannot be generated. This degrades the user-friendliness.

SUMMARY OF THE INVENTION

The present invention provides a technique which improves the user-friendliness when generating/displaying a content.

According to one aspect of the present invention, there is provided an information processing apparatus comprising: a specifying unit configured to specify that material data for generating a virtual-viewpoint content at what time is stored in a storage unit that stores a plurality of material data for generating a virtual-viewpoint content; and an output unit configured to output, based on a specification result from the specifying unit, information for causing an image to be displayed, the image indicating a time at which a virtual-viewpoint content can be generated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a view showing examples of the correspondence between the types of material data and obtained data groups;

DESCRIPTION OF THE EMBODIMENTS

Figure 1:
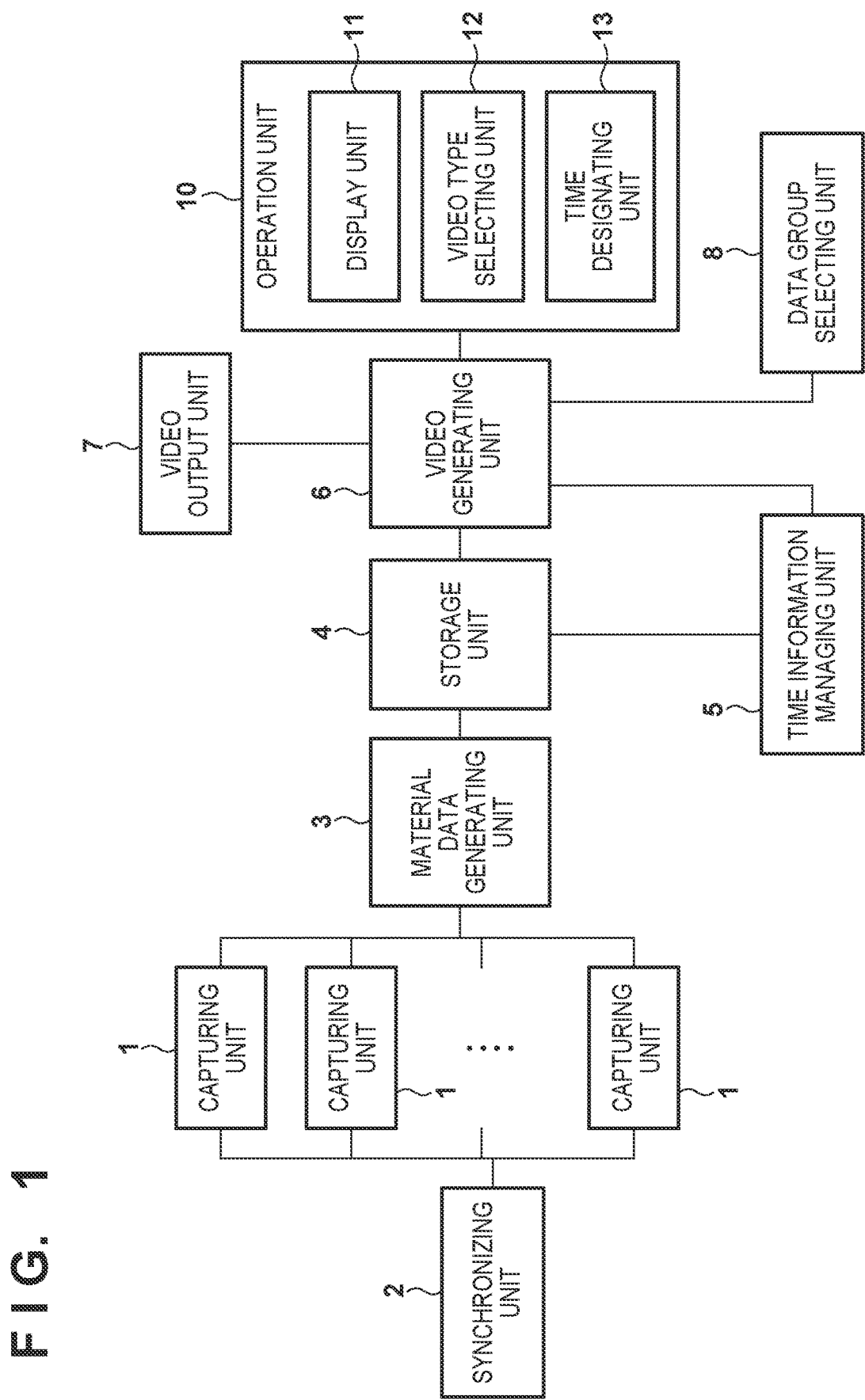
FIG. 1 is a view showing a configuration example of a system.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In each embodiment to be explained below, a system which generates a three-dimensional model of one or more objects from a plurality of images captured by a plurality of capturing apparatuses (cameras) and generates a free-viewpoint content (virtual-viewpoint content) based on the three-dimensional model will be explained. The generation of a three-dimensional model from images captured by a plurality of cameras generally requires a large amount of calculations and a long time. Especially when generating a high-resolution three-dimensional model, the size of a voxel must be decreased. Accordingly, the number of voxels increases, and this increases the number of times of determination on whether each voxel is projected into a silhouette. In this embodiment, therefore, a system is constructed by using a material data generating apparatus such as an image processing server which pre-generates and pre-stores, as material data, texture data holding a three-dimensional model and the color information of each voxel of the three-dimensional model or the like. A system like this can prevent a process of generating a three-dimensional model from being performed whenever a virtual-viewpoint content is generated, thereby increasing the efficiency of the process.

Note that three-dimensional data having a plurality of stages of resolution can be generated in accordance with an application, for example, a low-resolution three-dimensional model is generated by a relatively short processing time for live streaming, and a high-resolution three-dimensional model is generated for a highlight scene replay video or the like. In this case, a texture as one piece of material data can be generated for each of the high-resolution model and low-resolution model. It is also possible to generate polygon data or the like. That is, a plurality of different types of material data can be generated for the same object.

When a video generating apparatus for generating a virtual-viewpoint content from material data generates a virtual-viewpoint content in this system, video generation can be performed by obtaining pre-generated and pre-stored material data from the material data generating apparatus. In this case, the video generating apparatus cannot know whether material data necessary to generate a virtual-viewpoint content exists beforehand. For example, it is sometimes difficult to generate a three-dimensional model depending on, for example, the quality of an image captured by the capturing apparatus or the operation status of the capturing apparatus. That is, no material data exists for a specific object at a given timing in some cases. Also, when a plurality of different pieces of material data are generated for the same object as described above, the time required from the completion of generation to storage changes from one material data to another. That is, the generation of some material data may not be complete when the user requests the data. In addition, all or a large number of capturing apparatuses stop capturing in, for example, the halftime of soccer. In this time range, no material data may be stored at all.

When generating a virtual-viewpoint content at a time designated by the user, therefore, the video generating apparatus may generate the virtual-viewpoint content while inquiring of the material data generating apparatus whether each necessary material data is stored at the designated time. Note that if some necessary material data are not stored at the designated time, no virtual-viewpoint content can be generated at the designated time. That is, after having designated the time by the user, the user is notified that no virtual-viewpoint content can be generated at the designated time. This may degrade the user-friendliness.

Accordingly, the system according to this embodiment generates information about a time at which material data can be used. When the user generates a virtual-viewpoint content, the video generating apparatus is notified of information about a period during which a set of material data necessary to generate the virtual-viewpoint content can be used. In this system, the user can clearly recognize a time interval during which a virtual-viewpoint content can be generated. This makes it unnecessary to designate the time and check whether material data exists at the designated time. Note that details of the system which executes this processing and details of the processing will be explained by taking an example in which a sport in a sports ground (stadium) is captured and the image is used to generate a virtual-viewpoint video for live streaming or replay. However, the present invention is not limited to this, and it is also possible to generate a virtual-viewpoint video based on images captured in, for example, a concert hall, a fighting sport such as sumo wrestling, or a photo studio. Note that the embodiment to be explained below is merely an example, and it is possible to use an arbitrary arrangement and arbitrary procedure capable of executing the same processing without departing from the spirit and scope of the present invention.

(System Configuration)

FIG. 1 shows a configuration example of the system according to this embodiment. This system includes, for example, capturing units 1, a synchronizing unit 2, a material data generating unit 3, a storage unit 4, a time information managing unit 5, a video generating unit 6, a video output unit 7, a data group selecting unit 8, and an operation unit 10. Note that this system can be configured by either a single electronic apparatus or a plurality of electronic apparatuses.

Figure 2:
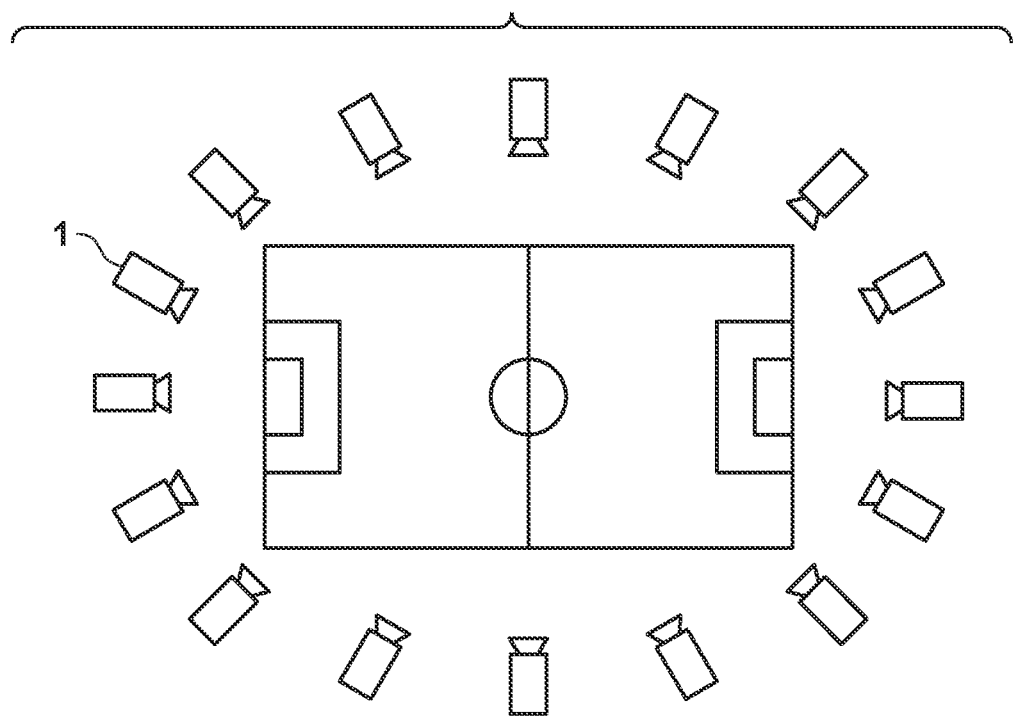
FIG. 2 is a view showing a layout example of capturing units.

In this system, a plurality of capturing units 1 perform capturing by precisely synchronizing with each other based on a synchronization signal from the synchronizing unit 2. Note that the plurality of capturing units 1 can be arranged so as to surround a ground or object as shown in FIG. 2. Each capturing unit 1 transmits the captured image to the material data generating unit 3. The material data generating unit 3 generates material data to be used when generating a virtual-viewpoint video, by using the multi-viewpoint images received from the capturing units 1, and outputs the material data to the storage unit 4. In this case, the material data generating unit 3 outputs time information based on the capturing time of the captured image used to generate the material data, to the storage unit 4 together with the material data. Note that the time information can be information about time, and can also be arbitrary time-related information such as a frame number.

The material data contains, for example, one or both of an object three-dimensional model as voxel data indicating the three-dimensional shape of an object, and an object texture for coloring each voxel of the object three-dimensional model. The material data can also contain one or both of a background three-dimensional model as polygon data for projecting a background other than an object, and a background texture image to be pasted on a polygon of the background three-dimensional model. The material data can further contain at least one of an object polygon model for decreasing the data transfer amount, and an object polygon texture to be pasted on the object polygon model. In addition, the material data can contain object position information which can be used to, for example, analyze the movement of a player. Note that the three-dimensional model of the material data can be generated by using, for example, the volume intersection method, but another method is also usable, so the three-dimensional model can also be generated by another arbitrary method. Furthermore, other material data can be generated by an arbitrary method.

The storage unit 4 stores the material data of one or more pieces of type information obtained from the material data generating unit 3, in association with time information. By thus storing each material data in association with the time information, the storage unit 4 can read out specific material data based on the time information and the type information of the material data. The storage unit 4 outputs the type information and time information of the completely stored (saved) material data to the time information managing unit 5.

The time information managing unit 5 generates or updates time range management information based on the type information and time information of the material data obtained from the storage unit 4. The time range management information records a time range continuously stored in the storage unit 4 for each type of material data. That is, the time information managing unit 5 specifies that material data for generating a virtual-viewpoint content at what time is stored in the storage unit 4, and records the result. Note that the abovementioned time range can be defined as a combination of the start time and end time of a time range in which material data is continuously stored, based on the time information obtained from the storage unit 4. For example, when material data not stored beforehand is newly stored, the time information managing unit 5 stores time information corresponding to the material data as the start time and end time. Also, when new data corresponding to a new time in a predetermined period from the time indicated by time information corresponding to already stored material data is stored, the time information managing unit 5 updates the end time of the material data, thereby extending the time range. When the predetermined time has elapsed from the time indicated by the time information of the already stored material data, the time information managing unit 5 terminates the update of the time range information of the already stored material data. Accordingly, when new data is stored together with time information indicating the time until which the predetermined period or more has elapsed from the latest end time of the already stored material data, the time information managing unit 5 generates new time range information by using the time as the start time. Note that in this case, time range management information specifying a plurality of time ranges is generated for one type of material data. Note also that the predetermined period herein mentioned can be, for example, a one-frame period, but can also be an arbitrary period longer than that.

The video generating unit 6 generates a virtual-viewpoint video by obtaining the material data from the storage unit 4, based on an instruction from the operation unit 10 that is connected to the video generating unit 6. The generated virtual-viewpoint video is output to a display unit 11 of the operation unit 10 and the video output unit 7, and displayed.

Figure 3:
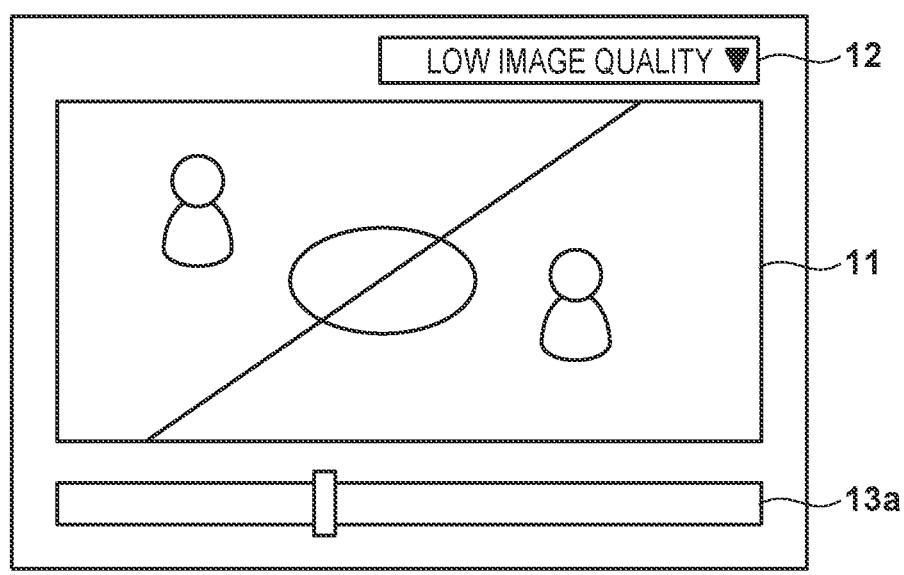
FIG. 3 is a view showing an example of a screen displayed on an operation unit.

The operation unit 10 provides a user interface such as a touch panel or a combination of buttons, a keyboard, or the like and a display, in order to accept inputs from the user and presents information to the user. As its functions, the operation unit 10 includes, for example, the display unit 11, a video type selecting unit 12, and a time designating unit 13. The operation unit 10 accepts user's operations by displaying, for example, a screen as shown in FIG. 3. In FIG. 3, the display unit 11 displays a generated virtual-viewpoint video. The video type selecting unit 12 selects the video type of a virtual-viewpoint video to be output. The time designating unit 13 designates the time of a virtual-viewpoint video to be generated. The video type selecting unit 12 accepts the selection of types such as "live streaming", "low-image-quality replay", "high-image-quality replay", "portable terminal", and "player position analysis". "Live streaming" is selected when generating a virtual-viewpoint video for immediate broadcasting which is allowed to have a low image quality. "Low-image-quality replay" is selected when generating a virtual-viewpoint video for performing replay playback with the same image quality as that of live streaming. In "live streaming" and "low-image-quality replay", a low-resolution three-dimensional model is used to generate a virtual-viewpoint video. "High-image-quality replay" is selected when generating a high-image-quality virtual-viewpoint video which is supposed to be repetitively viewed such as a highlight scene replay. In "high-image-quality replay", a high-resolution three-dimensional model is used to generate a virtual-viewpoint video. "Portable terminal" is selected when generating a virtual-viewpoint video having a small data amount. In "portable terminal", a virtual-viewpoint video is generated by using a three-dimensional model such as a polygon instead of a voxel. "Player position analysis" is selected when, for example, checking the way players move on a field. In "player position analysis", only position information is used, and a three-dimensional model of a player as an object is not used. Information of the selected video type is input to the data group selecting unit 8 via, for example, the video generating unit 6.

Based on the input video type, the data group selecting unit 8 selects a data group as a combination of material data necessary to generate a virtual-viewpoint video of the video type. For example, a data group to be selected for each video type described above can be one of combinations in a table shown in FIG. 4. For example, when "high-image-quality replay" is selected, a high-resolution object three-dimensional model, high-resolution object texture, background three-dimensional model, and high-resolution background texture are selected as a corresponding data group. When "player position analysis" is selected, it is only necessary to be able to specify the positions and movements of players, so object position information and a background three-dimensional model are selected as a corresponding data group. The data group selecting unit 8 notifies the video generating unit 6 of the selected data group. Based on the notified data group, the video generating unit 6 inquires of the time information managing unit 5 about an effective time range 20 indicating a time range in which all the elements of the data group are stored in the storage unit 4.

Figure 5:
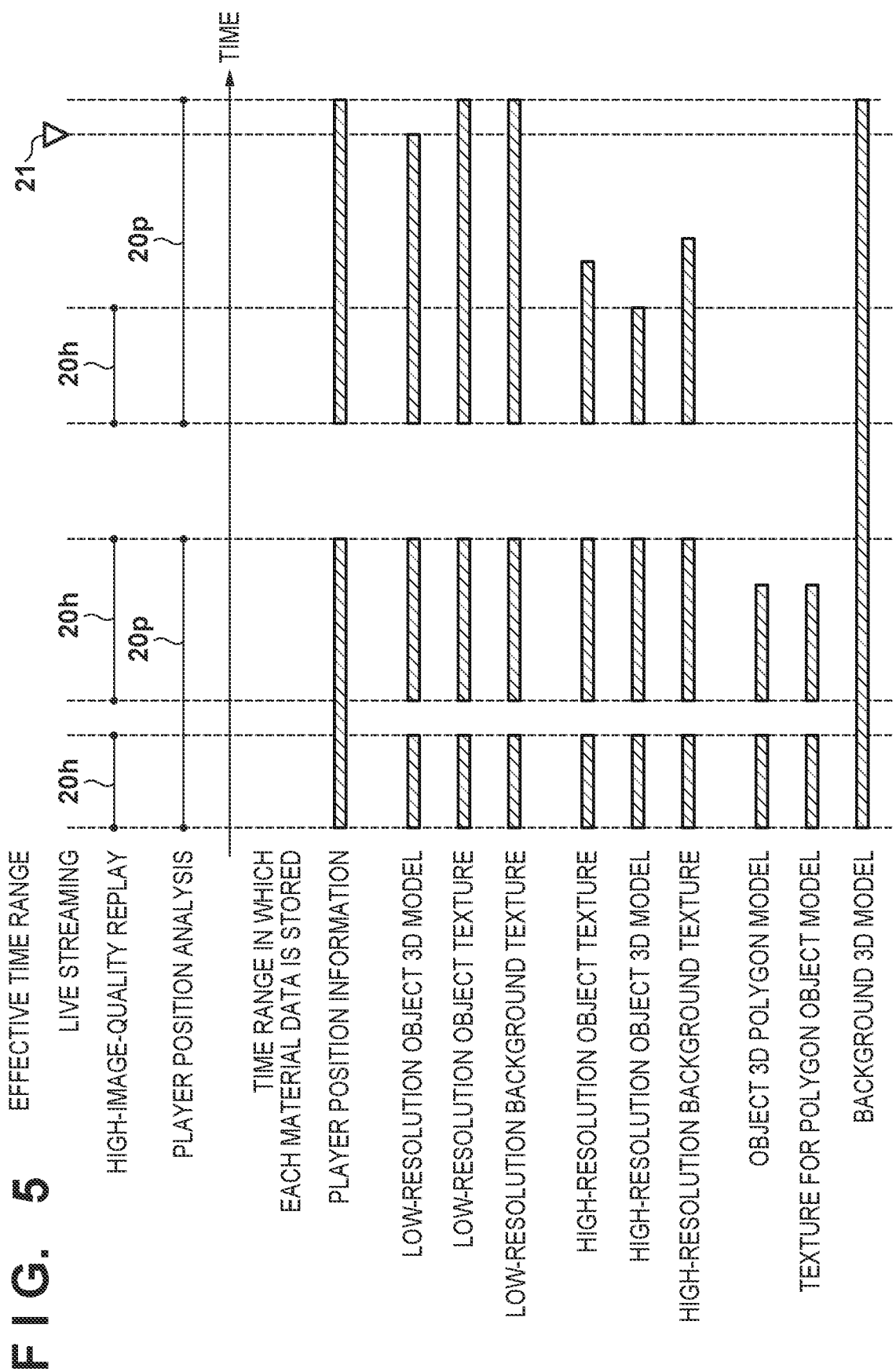
FIG. 5 is a view showing an example of time range management information.

As shown in FIG. 5, the time information managing unit 5 manages time range management information which specifies the time range of each material data stored in the storage unit 4. Upon receiving the inquiry designating the data group from the video generating unit 6, the time information managing unit 5 specifies a time range in which all the elements of the designated data group are stored, and returns the time range to the operation unit 10.

When the video type is, for example, a high-image-quality data group, the time information managing unit 5 specifies a time range in which all of a high-resolution object three-dimensional model, high-resolution object texture, background three-dimensional model, and high-resolution background texture are stored. That is, in this case, the time information managing unit 5 specifies a time range 20$h$ as the logical product of the time ranges of high-image-quality data. When the video type is a player position analysis data group, the time information managing unit 5 specifies a time range 20$p$ corresponding to a time range in which player position information is stored. When the video type is live streaming, as shown in FIG. 5, the time information managing unit 5 specifies latest time information 21 as a time at which all necessary data are available, as the effective time range 20. Then, the time information managing unit 5 outputs the specification result of the effective time range 20. Note that the time information managing unit 5 need only output information for displaying an image indicating the time at which a virtual-viewpoint content can be generated, and the contents of the information are not limited to the specification result of the effective time range 20. For example, the time information managing unit 5 may also output image data indicating the time at which a virtual-viewpoint content can be generated.

The operation unit 10 is notified of the specified effective time range 20 via the video generating unit 6, and the time designating unit 13 displays the information. Note that when a plurality of time ranges such as the time ranges 20$h$ and 20$p$ are specified as effective time ranges, the operation unit 10 is notified of all or some (for example, a predetermined number of time ranges) of the plurality of time ranges.

When the user designates, within the effective time range 20, the time of a video for which a virtual viewpoint is to be generated, the designated time is transmitted to the video generating unit 6. In this case, viewpoint information containing, for example, the position, the posture, and the angle of view of the virtual viewpoint to be drawn is determined by using a 3D mouse, and transmitted to the video generating unit 6. Note that it is unnecessary to use any 3D mouse, and the viewpoint information may also be determined by accepting an operation performed through a GUI or an operation performed on a dedicated operation unit. Based on the obtained designated time and the preset data type group, the video generating unit 6 requests and obtains necessary material data from the storage unit 4. In this case, it is confirmed in advance, based on the information of the effective time range 20, that a data group corresponding to the designated time requested by the video generating unit 6 is stored in the storage unit 4. Therefore, the video generating unit 6 can reliably obtain the target data without checking the presence/absence of the data. The video generating unit 6 generates a virtual-viewpoint video based on the obtained material data and the viewpoint information, and outputs the virtual-viewpoint video to the display unit 11 of the operation unit 10 and the video output unit 7.

In this arrangement, it is possible to notify the user of the information of the time range in which an appropriate virtual-viewpoint video can be generated by using the material data stored in the storage unit 4. Then, the user can designate a generation time of a virtual-viewpoint video from the notified time range. This eliminates the possibility that no virtual-viewpoint video can be generated at the designated time. Consequently, the user-friendliness can be improved when generating/displaying a virtual-viewpoint video.

(Display of Effective Time Range and Example of Video Playback Control)

Figure 6A:
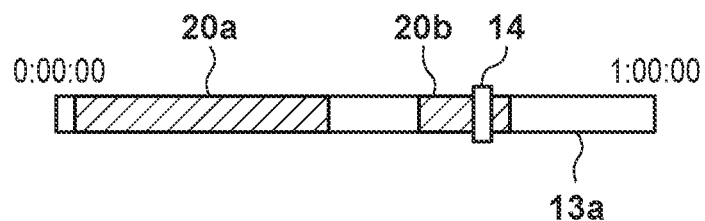
FIGS. 6A to 6C are views showing display examples of an effective time range in a time designating unit.
Figure 6B:
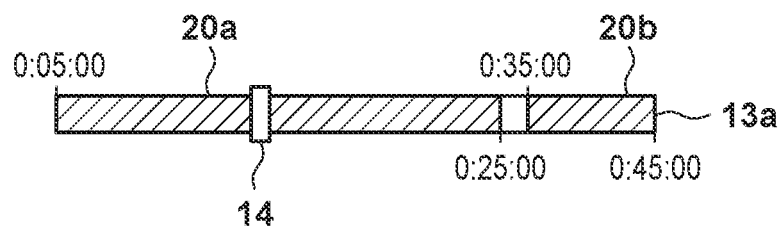

Next, an example of the method by which the time designating unit 13 displays the effective time range 20 and time designation by the user is accepted will be explained. For example, as shown in FIGS. 6A and 6B, the time designating unit 13 displays the effective time range 20 by using a seek bar 13a as a bar-like GUI (Graphical User Interface). In this example, two effective time ranges, that is, a first effective time range 20a and a second effective time range 20b are displayed. Note that this example herein explained is merely one example, and it is possible to use an arbitrary display method by which the effective time range and other time ranges can be distinguished from each other and an arbitrary time within the effective time range can be specified. For example, it is also possible to use an arrangement in which the time is designated by a counter value by using a physical jog dial or the like. In this case, the display of the effective time range may also be a list of data indicating one time range by the start time and end time.

In the example shown in FIG. 6A, the time designating unit 13 displays the two obtained effective time ranges 20a and 20b in one seek bar 13a by changing the color of a part of the seek bar 13a as effective ranges. In this case, the entire range of the seek bar 13a corresponds to the length of the whole expected content. When the content is a sport such as soccer, the whole of the seek bar 13a displays the time range from the start to the end of the game.

In the example shown in FIG. 6B, the time designating unit 13 displays a time range in which a desired virtual-viewpoint video cannot be generated, as a range shorter than a length corresponding to the length of the actual time range. Note that in this example shown in FIG. 6B, a period between the first and second effective time ranges 20a and 20b is displayed, but this period is not necessarily displayed. In this case, as shown in FIG. 6B, the seek bar 13a may also display numerical values indicating the start time and end time of the effective time range 20.

Note that the example shown in FIG. 6A is useful in that the user can easily recognize the time range of the whole content, the ratio of the effective time range 20 in that time range, and the present playback position. On the other hand, when, for example, the ratio of the effective time range 20 to the time range of the whole content is low, a display as shown in the example of FIG. 6B is useful because this display facilitates user's operations. The two display methods have different advantages as described above. Therefore, it is also possible to make these two display methods switchable, allow the user to select one of these display methods to be used, and cause the time designating unit 13 to accept the selection. The time designating unit 13 may also automatically select a display method to be used, based on, for example, a parameter such as the ratio of the effective time range 20 to the length of the time range of the whole content.

Figure 6C:
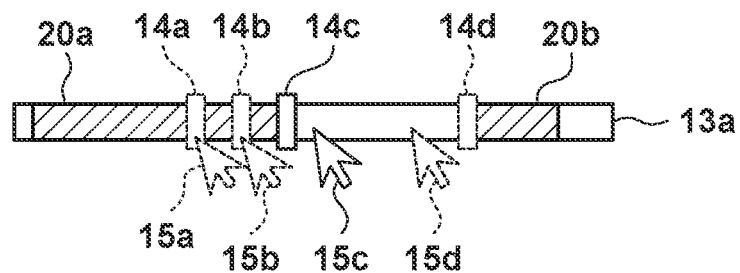

The user can move a cursor 14 to a given position in the effective time ranges 20a and 20b displayed by the time designating unit 13, thereby designating a time corresponding to the position as a virtual-viewpoint video generation/display time. The video generating unit 6 obtains material data corresponding to the designated time from the storage unit 4, generates a virtual-viewpoint video, and outputs the video to the video output unit 7 and operation unit 10. Note that the cursor 14 can be so designed that when designating a time, the cursor 14 can move only in the effective time ranges 20a and 20b on the seek bar 13a, that is, the cursor 14 cannot select a time outside the effective time ranges. An example in which the cursor 14 is so designed will be explained with reference to FIG. 6C. FIG. 6C shows an example using an interface which drags and moves the cursor 14 on the seek bar 13a by using a pointer 15. As shown in FIG. 6C, the user can move the cursor 14 to a position 14a or 14b by moving the pointer 15 to a position 15a or 15b in the first effective time range 20a while dragging the cursor 14. On the other hand, even when the user moves the pointer 15 to a position 15c while dragging the cursor 14, the cursor 14 is fixed to a position 14c as the end time of the first effective time range 20a. That is, the time designating unit 13 does not allow the cursor 14 to move outside the first effective time range 20a. On the other hand, when the user moves the pointer 15 to a position 15d in the second effective time range 20b or in a predetermined range from the second effective time range 20b while dragging the cursor 14, the cursor 14 is moved to a start time 14d of the second effective time range 20b. It is thus possible to prevent the selection of a time at which no virtual-viewpoint video can be generated, by preventing the cursor 14 from being moved to the time range between the first and second effective time ranges 20a and 20b. Note that the time designating unit 13 may also be so designed as to be able to select or designate a portion which is not the effective time range 20. Furthermore, instead of the arrangement in which the user cannot designate a time outside the effective time range, it is also possible to adopt an arrangement in which even if the user designates a time outside the effective time range, this designation is invalidated.

Figure 7A:
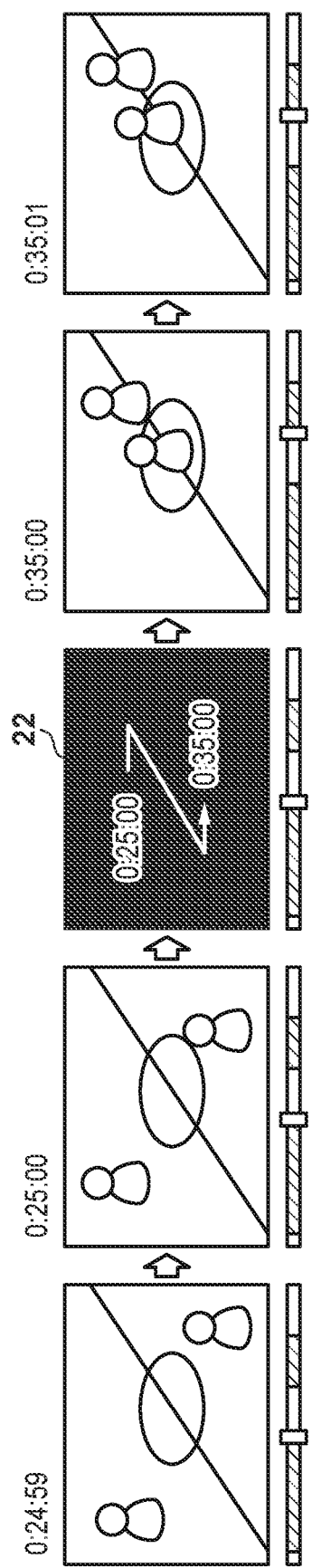
FIGS. 7A and 7B are views showing examples of video display across two discontinuous effective time ranges.
Figure 7B:
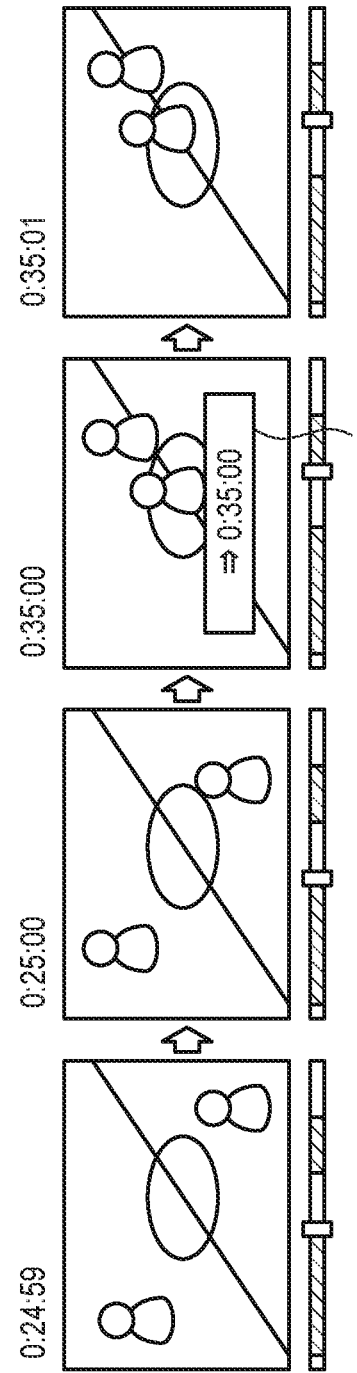

When the user designates one time in the effective time range 20, the video generating unit 6 can generate a virtual-viewpoint video at the designated time alone, but can also generate and play back a virtual-viewpoint video in successive frames after the designated time. In this case, if playback is started in the successive frames from the time in the effective time range 20a and continued after the end of the effective time range 20a, this playback may be continued even in a time range outside the effective time range between the effective time ranges 20a and 20b. Therefore, when the generation and playback of a video are complete until the end time of a given effective time range (the first effective time range 20*a*), it is possible to continuously perform the generation and playback of a virtual-viewpoint video from the start time of the next effective time range (the second effective time range 20*b*). Since the generation and playback of a virtual-viewpoint video are not stopped, the user is not requested to perform any operation and can view the continuous virtual-viewpoint video. Also, as shown in FIG. 7A, when a virtual-viewpoint video is played back over a plurality of effective time ranges, it is possible to insert, when the effective time ranges are switched, a display screen 22 which indicates that the virtual-viewpoint video as a playback target relates to a discontinuous time. Alternatively, as shown in FIG. 7B, when the playback of the effective time range is started after the switching, information 23 indicating that the virtual-viewpoint video as a playback target is related to a discontinuous time can be superimposed. These processes can show the user that a frame currently being played back is related to a time discontinuous from a frame played back before that. Note that if playback is complete until the end time of the last effective time range of a plurality of effective time ranges, the playback can be stopped at that point of time. Note that it is also possible to make setting of repetitive playback, and restart playback from the start time of the first effective time range when the setting is selected.

Also, when a real-time video is to be generated, for example, when "live streaming" is selected, the video generating unit 6 can obtain the latest time information 21, obtain material data at the time corresponding to the latest time information 21 from the storage unit 4, and generate a virtual-viewpoint video. Note that in this case, the time designating unit 13 need not always display the time indicated by the latest time information 21. Note also that when live streaming or the like is selected, a video at the latest time need only be displayed, and the time information need not clearly be shown. For example, when live streaming or the like is selected as the video type, the video generating unit 6 issues a "latest time" data group obtaining request to the time information managing unit 5 without designating any specific time. The time information managing unit 5 specifies the latest time at which the requested data group is already stored, reads out the data group at that time from the storage unit 4, and transmits the readout data group to the video generating unit 6. Note that the time information managing unit 5 may also instruct the storage unit 4 to transmit the data group to the video generating unit 6, without reading out the data group from the storage unit 4. The video generating unit 6 generates a virtual-viewpoint video by using the obtained material data group. In this case, the video generating unit 6 need not explicitly obtain information of the latest time. For example, when it is desirable to display the time information on the display unit 11 of the operation unit 10, the time information may also be obtained together with the material data group.

Modifications

The above-described arrangements and processes are merely examples, and it is possible to use various kinds of apparatus configurations, and perform the same processing by using different procedures and different display contents. Also, one functional block shown in FIG. 1 can be implemented by a plurality of electronic apparatuses, and one or more functional blocks can be implemented by one electronic apparatus. For example, FIG. 1 shows the material data generating unit 3 and storage unit 4 as independent functional blocks. However, these units may also be incorporated into the same processing apparatus, or these functional blocks and the video generating unit 6 may also be incorporated into one apparatus to obtain a virtual-viewpoint video distribution server or the like. Note that at least some functional blocks according to this embodiment can be implemented by a processor such as a CPU or MPU by executing programs stored in a memory such as a ROM or RAM. For example, the operation unit 10 can be implemented by a GUI (Graphical User Interface) which executes and displays a predetermined application program in a processor of a PC (Personal Computer), tablet, smartphone, or the like. Also, the video generating unit 6 and operation unit 10 can be implemented by executing an application program by a processor in a PC, tablet, and/or smartphone.

Furthermore, FIG. 1 shows a configuration example of the system which performs all of a series of processes from capturing by the capturing units 1 to the generation of a virtual-viewpoint content performed by the video generating unit 6 under operations by the operation unit 10, but the present invention is not limited to this. For example, it is also possible to individually prepare a system which performs capturing, the storage of material data, and the generation of time range management information, and a system which generates a virtual-viewpoint video. That is, when generating a virtual-viewpoint video, an information providing apparatus which stores the material data and time range management information and can provide these pieces of information need only exist, and a mechanism which generates these pieces of information need not exist in the system.

Note that in the above explanation, the time information managing unit 5 generates or updates time range management information when material data is stored in the storage unit 4, but the time range management information need not always be generated. For example, whenever receiving an inquiry about an effective time range from the video generating unit 6, the time information managing unit 5 can extract time information of material data stored in the storage unit 4, generate information related to the effective time range, and transmit the information to the video generating unit 6. This makes it possible to extract accurate time information based on material data stored at that point of time. Note also that upon receiving an inquiry about an effective time range from the video generating unit 6, the time information managing unit 5 specifies an effective time range related to a material data group for generating a virtual-viewpoint video of the video type designated by the inquiry. However, the present invention is not limited to this. For example, the time information managing unit 5 can generate data of an effective time range for each of a plurality of data groups in advance, and, in response to an inquiry from the video generating unit 6, can transmit the effective time range information generated beforehand in relation to the corresponding type to the video generating unit 6. The time information managing unit 5 may also generate, as the time range management information, a time range in which all data contained in a material data group for each type are stored, instead of generating time range management information for each material data. The time information managing unit 5 can also generate time range management information by another method. In addition, the time information managing unit 5 notifies, as the effective time range 20, the video generating unit 6 of the logical product of time ranges indicated by time range management information for a designated material data group, but the present invention is not limited to this. For example, the time information managing unit 5 can transmit time range management information of each material data to the video generating unit 6, and the video generating unit 6 or operation unit 10 can calculate the logical product of time ranges indicated by the information and specify the calculation result as an effective time range. Also, the video generating unit 6 or operation unit 10 can execute a process of, for example, specifying a plurality effective time ranges for each of a plurality of video types, and displaying the plurality of effective time ranges in parallel on the time designating unit 13 of the operation unit 10. Furthermore, the operation unit 10 obtains time range management information via the video generating unit 6, but may also directly obtain this time range management information from the time information managing unit 5.

In the above explanation, the operation unit 10 includes the video type selecting unit 12, and the video type selecting unit 12 selects a video type. However, the present invention is not necessarily limited to a configuration like this. For example, a video type may also automatically be determined in accordance with the type or performance of the video generating unit 6 and/or the operation unit 10. For example, the system may also be configured such that a video type is automatically selected based on the authority of the user who operates the operation unit 10. Note that the data group selecting unit 8 need not exist when a video type is determined in accordance with, for example, the type or performance of the video generating unit 6. For example, the video generating unit 6 need not inquire of the data group selecting unit 8 about anything by holding information of a fixed data combination. In addition, when a video type is determined based on the performance or the like of the video generating unit 6, the data group selecting unit 8 can be connected to the storage unit 4 or time information managing unit 5. In this case, the video generating unit 6 can transmit, to the time information managing unit 5, an inquiry containing information capable of specifying the type and performance, for example, information of the type, performance, and the like of its own apparatus, or model information or identification information of its own apparatus, without designating any data group. Based on the information contained in this inquiry, the time information managing unit 5 specifies a corresponding material data group, and notifies the video generating unit 6 of information of an effective time range corresponding to the specified data group.

In the above explanation, all material data are stored in association with time information, but the present invention is not limited to this. For example, the storage unit 4 can store single data for a background three-dimensional model if there is no change. In response to an inquiry about an effective time range, the storage unit 4 can regard the data as effective at all times, and output the same data to the video generating unit 6 whenever receiving an obtaining request. Material data like this may also be regarded as not a target of an inquiry about an effective time range. When obtaining this material data once, the video generating unit 6 can continuously use the material data.

The arrangement in which the video generating unit 6 is connected to the storage unit 4 and time information managing unit 5 and uses material data has been explained. However, a functional unit other than the video generating unit 6 may also use material data. For example, the system can also be configured such that an object analyzing apparatus which does not generate any video but measures the position and speed of an object uses object position information as material data.

In the above explanation, an example in which the video type selecting unit 12 of the operation unit 10 selects one of the five video types "live streaming", "low-image-quality replay", "high-image-quality replay", "portable terminal", and "player position analysis" has been explained, but the video types are not limited to them. For example, it is also possible to set video types "Full HD", "4K", "broadcasting", "online distribution", and "mobile terminal", or omit some of these video types. Furthermore, when generating a video, it is also possible to directly designate the type of material data to be obtained, without specifying any video type.

The video type selecting unit 12 of the operation unit 10 can also be so configured as to be able to select a video type having priority such as "high-image-quality preferential replay". In "high-image-quality replay" described above, only an effective time range in which a high-quality virtual-viewpoint video can be generated is obtained, and only a high-quality virtual-viewpoint video is generated. In "high-image-quality preferential replay", however, a high-quality virtual-viewpoint video is generated in a time range in which a high-quality virtual-viewpoint video can be generated, and a low-quality virtual-viewpoint video is generated in a time range in which a low-quality virtual-viewpoint video can be generated, as another time range. This makes it possible to prevent the viewer from feeling incongruity by interruption of the image. In this case, the data group selecting unit 8 specifies data groups given a plurality of priorities, such as an essential data group, high-priority data group, and low-priority data group, based on a designated video type, and notifies the video generating unit 6 of the specified data groups. In an example of "high-image-quality preferential replay", the high-priority data group can contain a high-resolution object three-dimensional model, high-resolution object texture, and high-resolution background texture for generating a high-resolution video. On the other hand, the low-priority data group can contain a low-resolution object model, low-resolution object texture, and low-resolution background texture capable of generating a low-resolution video. Also, the essential data group can be a background model. Note that the method of determining whether to give high priority or low priority to data is not limited to this. For example, when the capacity of a communication line is small, it is possible to perform setting so as to give high priority to low-resolution data, and low priority to high-resolution data.

Figure 8:
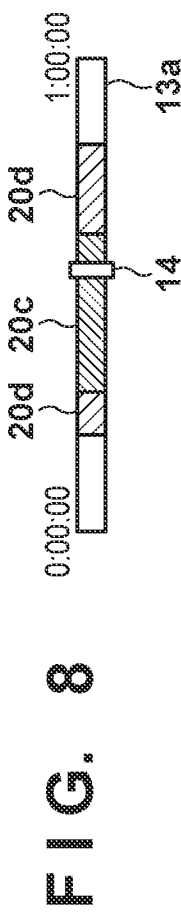
FIG. 8 is a view showing another display example of the effective time ranges in the time designating unit.

Based on these data groups, the video generating unit 6 inquires of the time information managing unit 5 about the effective time range. In response to this inquiry, the time information managing unit 5 specifies a time range in which both the essential data group and high-priority data group are stored, as a high-preference range in which the high-priority data group is obtained as indicated by 20c in FIG. 8. Also, of time ranges other than the high-preference range 20c, the time information managing unit 5 specifies a time range in which the essential data group and low-priority data group are obtained, as a low-preference range as indicated by 20d in FIG. 8. Then, the time information managing unit 5 transmits information of the specified high-preference range 20c and low-preference range 20d to the video generating unit 6. The operation unit 10 displays the received effective time range 20 so that the high-preference range 20c and low-preference range 20d can be distinguished from each other (by, for example, different colors). This display allows the user to make such a decision that, for example, a high-resolution virtual-viewpoint video is mainly generated by designating a time in the high-preference range 20c, but a time in the low-preference range 20d is designated when the user wants to generate a video at a given time even if the resolution is low. Note that the low-preference range may also be specified independently of the high-preference range 20c. In this case, the video generating unit 6 or operation unit 10 can specify an overlapped range of the high-preference range and low-preference range as a high-preference range. The operation unit 10 can also display the high-preference range and low-preference range in parallel. Furthermore, for example, a time range which is neither the high-preference range 20c nor the low-preference range 20d can be displayed as shown in the example of FIG. 6A or 6B.

Note that the video generating unit 6 inquires of the time information managing unit 5 about the priority set for each data type, but the present invention is not limited to this. For example, the video generating unit 6 can make an inquiry to the time information managing unit 5 for each priority, and the operation unit 10 or video generating unit 6 can integrate the effective time ranges 20 obtained for the individual priorities and display the integrated effective time range 20 on the time designating unit 13.

Note also that the effective time range 20 is specified by classifying data into the high-priority data group for generating a high-resolution video and the low-priority data group capable of generating a low-resolution video, and the video generating unit 6 obtains material data based on the effective time range 20. However, the present invention is not limited to this. For example, when a high-resolution object model and high-resolution object texture can be obtained but only a low-resolution background texture can be obtained, it is unnecessary to use low-resolution data for the object in accordance with the background texture. In a case like this, the video generating unit 6 may also be so configured as to use low-resolution data as the background texture. For this configuration, it is also possible to make a priority combination for each data type classification such as a three-dimensional model or texture, and cause the video generating unit 6 to preferentially obtain high-priority material data for each data type classification. In this case, the time designating unit 13 can distinguishably display an effective time range in which high-priority data can be obtained for all types, and an effective time range in which only low-priority data can be obtained for at least some data types.

Figure 9:
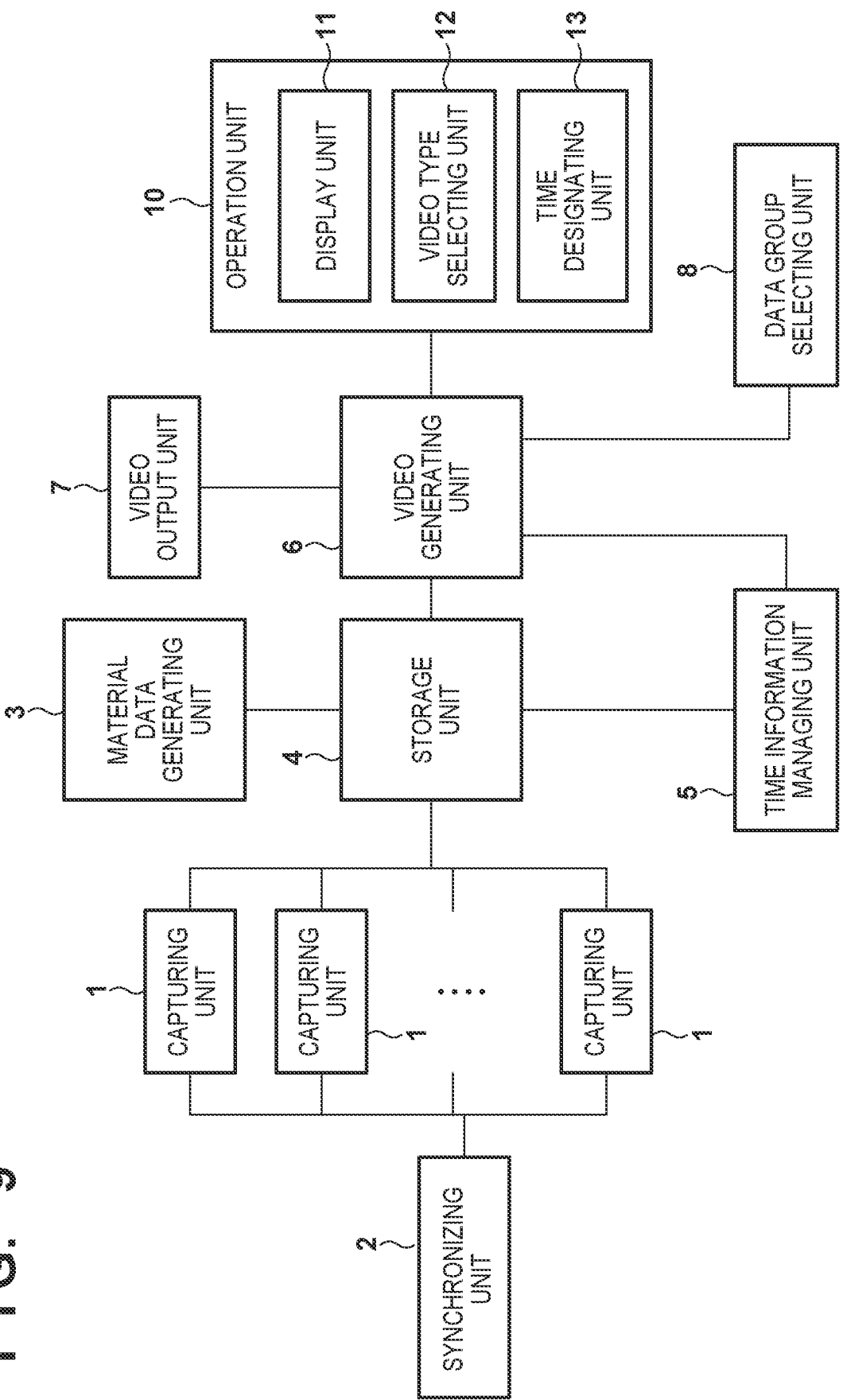
FIG. 9 is a view showing another configuration example of the system.

In the above-described example, images captured by the plurality of capturing units 1 are input to the material data generating unit 3, and the storage unit 4 stores material data generated by the material data generating unit 3. However, the present invention is not limited to this. For example, it is also possible to store all images captured by the plurality of capturing units 1 in the storage unit 4 once, and cause the material data generating unit 3 to generate material data by using the stored images. FIG. 9 shows an example of this configuration. In this configuration shown in FIG. 9, the material data generating unit 3 generates material data by using a plurality of images stored in the storage unit 4, and outputs the generated material data and time information corresponding to the material data to the storage unit 4. Accordingly, when generating high-image-quality material data, for example, the material data generating unit 3 can generate material data having undergone editing/modification such as manual correction, or material data based on an image having undergone editing/modification.

In this arrangement, images captured by the plurality of capturing units 1 are stored in the storage unit 4, so material data having a higher image quality can be generated by using a long time based on these images. As a consequence, it is possible to generate a virtual-viewpoint video having a higher grade. Note that it takes a high cost to make high-quality material data, so high-grade material data is sometimes not formed in all time ranges. In this case, it is possible to generate a high-quality virtual-viewpoint video in a time range in which a high-quality virtual-viewpoint video can be generated, and generate a low-quality virtual-viewpoint video in other portions, by using the priorities as described above.

Note that in the above-described embodiment, the system for generating a virtual-viewpoint video has been explained. However, the above-described technique can be applied to an information processing system for generating a content, such as a free-listening-point audio, other than a virtual-viewpoint video. That is, the above discussion is applicable to a given information processing apparatus which obtains one or more material data and generates an arbitrary content from the material data. That is, when one or more material data for generating a content exist, the information processing apparatus obtains information about a time to which each material data corresponds. Then, the information processing apparatus specifies, based on the information, an effective time range in which the content can be generated, and generates the content by obtaining material data for a time in this range. In this case, the information processing apparatus can distinguishably display the effective time range, and a time range in which the content cannot be generated. Note that in the above-described embodiment, the method of displaying a time range in which, for example, a high-priority content can be generated such that this time range can be distinguished from other time ranges by coloring these time ranges in accordance with their priorities has been explained. However, this method can also be extended. For example, a method of distinguishably displaying types/combinations of generable contents can be used. For example, it is possible, by coloration or the like, to distinguishably display a time range in which both a virtual-viewpoint video and free-listening-point audio can be generated, a time range in which only a virtual-viewpoint video can be generated, a time range in which only a free-listening-point audio can be generated, and a time range in which neither can be generated. In addition, it is also possible to classify the contents based on the resolution or the like, and perform distinguishable display in accordance with the classification. Note that the effective time ranges corresponding to the individual types of the contents may also be displayed in parallel. By thus displaying the types of generable contents so that the user can distinguish between them, it is possible to improve the user-friendliness when the user generates a content.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-171378, filed Sep. 6, 2017, which is hereby incorporated by reference herein in its entirety.

What is claimed is:

1. An information processing apparatus comprising:
a specifying unit configured to specify that material data for generating a virtual-viewpoint content at what time is stored in a storage unit that stores a plurality of material data for generating a virtual-viewpoint content; and
an output unit configured to output, based on a specification result from the specifying unit, information for displaying an image distinguishably indicating a time range in which a virtual-viewpoint content can be generated and a time range in which a virtual-viewpoint content cannot be generated.

2. The apparatus according to claim 1, wherein the material data stored in the storage unit are a plurality of types of material data containing three-dimensional shape data of an object and texture data having color information of the three-dimensional shape.

3. The apparatus according to claim 1, wherein the information output from the output unit is information indicating a time at which a virtual-viewpoint content can be generated.

4. The apparatus according to claim 1, wherein the information output from the output unit is information indicating that, for each data type of material data to be used to generate a virtual-viewpoint content, material data having a data type for generating a virtual-viewpoint content at what time is stored in the storage unit.

5. The apparatus according to claim 1, further comprising a display control unit configured to cause a display unit to display a seek bar that indicates, in an identifiable manner, a time range in which a virtual-viewpoint content can be generated and a time range in which a virtual-viewpoint content cannot be generated, based on the information that is output by the output unit.

6. The apparatus according to claim 1, further comprising a selecting unit configured to select not less than one type of a plurality of types of virtual-viewpoint contents, based on at least one of a user operation and a user attribute,
wherein the output unit outputs information for displaying an image indicating a time at which a virtual-viewpoint content corresponding to the type selected by the selecting unit can be generated.

7. The apparatus according to claim 6, wherein the plurality of types of virtual-viewpoint contents include a plurality of virtual-viewpoint contents different in image quality.

8. The apparatus according to claim 1, wherein the information output from the output unit is information indicating, for not less than one time, which one of a plurality of types of virtual-viewpoint contents can be generated at the time.

9. The apparatus according to claim 1, wherein the output unit outputs, for each of a plurality of types of virtual-viewpoint contents, information for displaying an image indicating a time at which a virtual-viewpoint content of the type can be generated.

10. The apparatus according to claim 1, further comprising:
an accepting unit configured to accept instruction information which is based on a user operation for an image displayed in accordance with information output by the output unit, and which designates a time at which a virtual-viewpoint content is to be generated; and
a generating unit configured to obtain, from the storage unit, a plurality of material data corresponding to the time designated by the designation information accepted by the accepting unit, and to generate a virtual-viewpoint content by using the obtained plurality of material data.

11. The apparatus according to claim 10, further comprising a limiting unit configured to limit a user operation from designating a time at which a virtual-viewpoint content cannot be generated, based on a specification result from the specifying unit.

12. The apparatus according to claim 10, wherein if times at which virtual-viewpoint contents can be generated exist over a plurality of discontinuous time ranges and the virtual-viewpoint contents are played back across the plurality of time ranges, the generating unit generates the virtual-viewpoint contents such that display showing that the times corresponding to the virtual-viewpoint contents are discontinuous is played back.

13. The apparatus according to claim 1, further comprising an obtaining unit configured to obtain information about a capturing time of a captured image used to generate material data stored in the storage unit,
wherein the specifying unit specifies that material data for generating a virtual-viewpoint content at what time is stored in the storage unit, based on the information obtained by the obtaining unit.

14. The apparatus according to claim 1, wherein the output unit outputs the information for displaying the image to a display apparatus or another information processing apparatus.

15. The apparatus according to claim 14, wherein
the other information processing apparatus comprises an accepting unit configured to accept designation indicating a time at which a virtual-viewpoint content is to be generated, and
the output unit outputs the information for displaying the image to the other information processing apparatus.

16. The apparatus according to claim 1, wherein the image is an image distinguishably indicating, as a time range in which a virtual viewpoint content can be generated, a first time range in which a virtual viewpoint content having a first quality can be generated and a second time range in which a virtual viewpoint content having a second quality different from the first quality can be generated.

17. The apparatus according to claim 1, wherein the image is an image indicating, as a time range in which a virtual viewpoint content cannot be generated, a time range in which a virtual viewpoint content having a predetermined quality cannot be generated.

18. An information processing method comprising:
specifying that material data for generating a virtual-viewpoint content at what time is stored in a storage unit for storing a plurality of material data for generating a virtual-viewpoint content; and
outputting, based on a specification result in the specifying, information for displaying an image distinguishably indicating a time range in which a virtual-viewpoint content can be generated and a time range in which a virtual-viewpoint content cannot be generated.

19. The method according to claim 18, wherein the information output in the outputting is information indicating that, for each data type of material data to be used to generate a virtual-viewpoint content, material data having a data type for generating a virtual-viewpoint content at what time is stored in the storage unit.

20. The method according to claim 18, further comprising selecting not less than one type of a plurality of types of virtual-viewpoint contents, based on at least one of a user operation and a user attribute,
wherein in the outputting, information for displaying an image indicating a time at which a virtual-viewpoint content corresponding to the type selected in the selecting can be generated.

21. A non-transitory computer-readable storage medium that stores a program for causing a computer to:
specify that material data for generating a virtual-viewpoint content at what time is stored in a storage unit for storing a plurality of material data for generating a virtual-viewpoint content; and
output, based on a specification result, information for displaying an image distinguishably indicating a time range in which a virtual-viewpoint content can be generated and a time range in which a virtual-viewpoint content cannot be generated.

22. An information processing apparatus that operates in a system in which a virtual-viewpoint content is generated using a plurality of material data, comprising:
a specifying unit configured to specify a generation apparatus in the system that generates a virtual-viewpoint content can use material data for generating a virtual-viewpoint content at what time; and
an output unit configured to output, based on a specification result from the specifying unit, information for displaying an image distinguishably indicating a time range in which a virtual-viewpoint content can be generated and a time range in which a virtual-viewpoint content cannot be generated.

23. The apparatus according to claim 22, wherein material data that can be used by the generation apparatus is material data that is stored in a storage apparatus in the system.

24. The apparatus according to claim 22, wherein the material data for generating a virtual-viewpoint content includes a plurality of kinds of material data.

* * * * *